(12) United States Patent
Xu et al.

(10) Patent No.: US 9,709,759 B2
(45) Date of Patent: Jul. 18, 2017

(54) NXN PARALLEL OPTICAL TRANSCEIVER

(71) Applicant: (SOURCE PHOTONICS (CHENGDU) CO., LTD.), Sichuan (CN)

(72) Inventors: Yuanzhong Xu, Chatsworth, CA (US); Jinglei Mao, Chengdu (CN); Qiang Wang, Chengdu (CN); Kui Wu, Chengdu (CN)

(73) Assignee: Source Photonics (Chengdu) Co., Ltd., Chengdu (CN)

( * ) Notice: Subject to any disclaimer, the term of this patent is extended or adjusted under 35 U.S.C. 154(b) by 0 days.

(21) Appl. No.: 14/383,883

(22) PCT Filed: Apr. 18, 2014

(86) PCT No.: PCT/CN2014/075689
§ 371 (c)(1),
(2) Date: Sep. 8, 2014

(87) PCT Pub. No.: WO2015/157990
PCT Pub. Date: Oct. 22, 2015

(65) Prior Publication Data
US 2017/0023750 A1   Jan. 26, 2017

(51) Int. Cl.
*G02B 6/42* (2006.01)
*G02B 6/43* (2006.01)
(Continued)

(52) U.S. Cl.
CPC ....... *G02B 6/4246* (2013.01); *G02B 6/12004* (2013.01); *G02B 6/32* (2013.01);
(Continued)

(58) Field of Classification Search
None
See application file for complete search history.

(56) References Cited

U.S. PATENT DOCUMENTS 4,960,315 A * 10/1990 Kostal ............... H04B 10/1127
385/33
6,399,397 B1 * 6/2002 Zarling ................. B82Y 15/00
435/7.1

(Continued)

OTHER PUBLICATIONS

Koller et al., White Paper—MPO and MTP—Introduction to Parallel Optics Technology, R&M Convincing cabling solutions, 2011.

*Primary Examiner* — Tina Wong
(74) *Attorney, Agent, or Firm* — Andrew D. Fortney; Central California IP Group, P.C.

(57) ABSTRACT

An N×N parallel optical transceiver includes a printed circuit board, a laser driving control chip, one or more lasers, two GRIN lenses, an optical band-pass filter, a multimode fiber array and a photodiode array. In the transmitter, laser beams of the same wavelength simultaneously output from the laser chip are first focused by the first GRIN lens, then the beams pass through a wavelength band-pass filter and are refocused by the second GRIN lens, and enter the channels in the multimode fiber array. In the receiver, laser beams of a different wavelength from the multimode fiber array are focused by the second GRIN lens, then reflected by the band-pass filter, refocused by the second GRIN lens, and received by the photodiode array. The multi-channel parallel transceiver has a small form, and can integrate a DFB or FP laser chip and GRIN lenses.

21 Claims, 2 Drawing Sheets

(51) Int. Cl.
*G02B 6/12* (2006.01)
*G02B 6/32* (2006.01)
*H04B 10/40* (2013.01)

(52) U.S. Cl.
CPC ............ *G02B 6/425* (2013.01); *G02B 6/4206* (2013.01); *G02B 6/428* (2013.01); *G02B 6/4215* (2013.01); *G02B 6/4279* (2013.01); *G02B 6/4292* (2013.01); *G02B 6/43* (2013.01); *H04B 10/40* (2013.01); *G02B 6/4207* (2013.01); *G02B 2006/12121* (2013.01); *G02B 2006/12123* (2013.01)

(56) References Cited

U.S. PATENT DOCUMENTS

| | | | |
|---|---|---|---|
| 6,438,291 B1* | 8/2002 | Duck | G02B 6/125 385/24 |
| 6,937,809 B1* | 8/2005 | Zhang | G02B 6/29361 385/14 |
| 2013/0322883 A1* | 12/2013 | Dahlfort | H04J 14/0209 398/84 |

* cited by examiner

NXN PARALLEL OPTICAL TRANSCEIVER

FIELD OF THE INVENTION

The present invention generally relates to the field of (optical) fiber communication. More specifically, embodiments of the present invention pertain to parallel optical transceivers, methods of making and using the same, and systems including the same.

DISCUSSION OF THE BACKGROUND

As one implementation of high speed optical transmission, an advantage of parallel optical transceiving (e.g., optical signal transmission and reception) lies in technology and cost. Parallel optical transceiving utilizes intermediate, high speed photoelectric technology and repeating (e.g., multiple) channels to achieve a high speed, large capacity transmission. Particularly, in short-distance communication, such as interconnection between backplanes in a large communication system and data transmission within a local area network, parallel optical transceiving is characterized in that it has a high transmission speed, small size, low weight, low crosstalk, etc. Driven by wireless communication, video, voice service, etc., a communication solution of higher speed, larger capacity and longer distance is requested and/or desired.

In conventional parallel optical transceivers, VCSELs (Vertical Cavity Surface Emitting Laser) are used as optical signal sources. As limited by the material(s) and the manufacturing technique(s), VCSELs are suitable for a waveband of 850 nm, but use at other wavelengths or wavebands has met challenges that have been difficult to overcome. Standard fiber transmission at 850 nm brings large loss(es) such that conventional parallel optical transceivers having VCSELs are used primarily for short-distance transmission within a range of about 300-500 meters, far below the requirement for data transmission and PONs (Passive Optical Networks).

Reference 1 (CN1665086A) discloses adding a gradient-index or graded index (GRIN) lens array into a VCSEL array coupled to a fiber array to smoothly and continuously focus emergent rays on the access point of the fiber array. This design is relatively complicated, and appears to be limited to a parallel optical transmitter for a short-distance transmission (less than 300 meters).

Reference 2 (EP1253450A2) discloses a design including three fibers and an optical portion, wherein the optical portion comprises two GRIN lenses and a filter. Specifically, this design relates to wavelength division multiplexing without parallel light waves. Moreover, this optical link design does not appear to be broadly applied or adapted.

SUMMARY OF THE INVENTION

This present invention is intended to improve or increase the transmission distance and the applied range of conventional parallel optical transceivers. The present invention provides a parallel optical transceiver (e.g., an N×N parallel optical transceiver), the optical transceiver comprising: a printed circuit board, a laser driving control chip or circuit, one or more lasers (e.g., one or more laser chips), two GRIN lenses, an optical (e.g., band-pass) filter, a multimode fiber array, and a photodiode (PD) array. The printed circuit board may carry high frequency signals and be used as a base for other components of the optical transceiver. One end of the printed circuit board includes a signal input interface (e.g., in the form of a "golden finger"). The laser driving control chip is configured to control the laser(s) and can be directly integrated into or onto the printed circuit board. The two GRIN lenses flank the optical filter, and at least one of the lenses is fixed to the printed circuit board (e.g., after active alignment). In the transmitter, which may include a first optical link, the laser(s) may be attached to the printed circuit board by flip chip bonding (e.g., after active alignment), and provide N laser beams of the same wavelength at the same time (where N is an integer of at least 2). The N beams are focused by the first GRIN lens and pass through the optical filter (which may function or work as a band-pass filter to selectively pass light from the laser of a selected or predetermined wavelength or band), then the N beams are refocused by the second GRIN lens, and enter N channels in the multimode fiber array. In the receiver, which has a second optical link, N laser beams of the same wavelength from a number of channels (e.g., N channels, where in one example, N is 4) in the multimode fiber array are focused by the second GRIN lens and reflected by the surface of the filter, and the N reflected beams are refocused by the second GRIN lens before entering the PD array. The light from the fiber array has a different wavelength or band from the light from the laser(s).

The laser(s) may comprise a plurality of laser chips, and each of the laser chips may comprise a distributed feedback (DFB) or Fabry-Perot (FP) laser chip.

The laser chips may be spaced apart from each other by 0.1 mm and/or have a numerical aperture of 0.4 µm, and the laser chips may be spaced apart from the first GRIN lens by a distance of 0.5 mm.

The GRIN lenses may each comprise a cylindrical optical lens having a refractive index that varies along its radial axis, and the GRIN lenses may smoothly focus the light from laser devices to the multimode fiber array, as well as from the multimode fiber array to the photodiode array.

The multimode fiber array may comprise one or more multi-fiber push-on (MPO) and/or MTP® standard connector interfaces, and may have one or more dimensions and/or constructions defined by the MTP® and/or MPO standard(s).

The PD array may comprise a 1×N linear array of photodiode chips. In general, PD chips are easier to couple to other component(s) in the optical transceiver than lasers (e.g., laser diodes [LDs]).

The PD chips in such an array may be spaced apart from each other by 0.15 mm, and the center distance between the PD array and the multimode fiber array is 0.7 mm.

The present invention further concerns a parallel optical transceiver, comprising a printed circuit board, a laser driving control chip, one or more GRIN lenses, a band-pass filter, a multimode fiber array, and a PD array. The printed circuit board may carry high frequency signals and be used as a base, and one end of the printed circuit board includes a signal input interface (e.g., a "golden finger"). The GRIN lens(es) and the band-pass filter are fixed to the printed circuit board (e.g., after active alignment). One of the GRIN lenses focuses N laser beams from the N channels of the multimode fiber array, and the band-pass filter reflects the N laser beams from the multimode fiber array towards the PD array. The N reflected laser beams are refocused by the one GRIN lens onto the PD array. The N reflected laser beams have a common (i.e., the same) wavelength.

The present invention further concerns an N×N parallel optical transceiver, comprising a printed circuit board, a laser driving control chip, two or more GRIN lenses, an optical and/or bandpass filter, and a multimode fiber array having N channels. The printed circuit board may be used as a base for other components of the optical transceiver, and one end of the printed circuit board includes a signal input interface (e.g., including a "golden finger"). The optical transceiver may further comprise N lasers (e.g., laser chips), which may be attached to the printed circuit board by flip chip bonding (e.g., after active alignment). The lasers are configured to provide laser beams having the same wavelength. A first GRIN lens focuses the laser beams, and the optical/band-pass filter passes the laser beams through to a second GRIN lens (e.g., the optical/band-pass filter is transparent to the wavelength of the laser beams from the laser[s]). The second GRIN lens refocuses the N laser beams on a location on or in the N channels of the multimode fiber array.

Relative to the background art, the present invention advantageously provides multichannel long-distance parallel optical communications which may use DFB or FP lasers and GRIN lenses, and may also achieve miniaturization and/or greater integration of corresponding components and/or devices. These and other advantages of the present invention will become readily apparent from the detailed description of various embodiments below.

DETAILED DESCRIPTION

Figure 1:
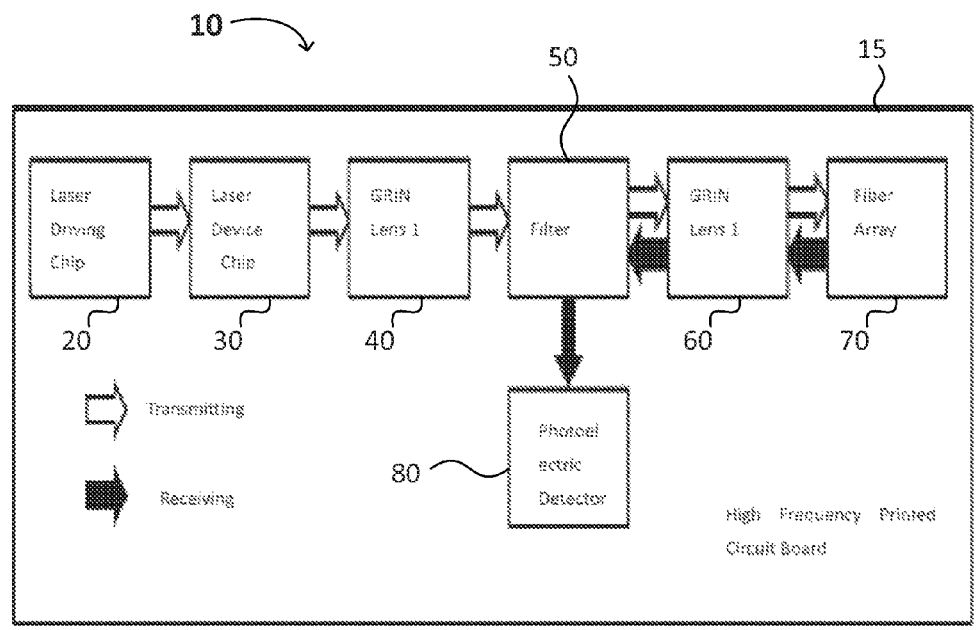
FIG. 1 is a structural diagram showing an N×N parallel optical transceiver.

Technical aspects of embodiments of the present invention will be fully and clearly described in conjunction with the accompanying drawings. In the following embodiments, it will be understood that the descriptions are not intended to limit the invention to these embodiments. Based on the disclosed embodiments of the present invention, other embodiments that can be obtained by one skilled in the art without creative or inventive contribution are considered within the scope of legal protection given to the present invention.

For example, in one embodiment, the N×N parallel optical transceiver may comprise a 4×4 parallel optical transceiver. The 4×4 parallel optical transceiver may comprise a high frequency printed circuit board, a laser driving control chip, 4 DFB laser chips, 2 GRIN lenses, a filter, a multimode fiber array and a 1×4 photodiode (PD) chip array. The optical transceiver can be employed in 2.5 Gbit/s applications, 10 Gbit/s applications, and applications at higher transmission speeds.

The printed circuit board is used as a base for fixing or attaching elements, such as laser chips, GRIN lenses, etc. The position of each of these elements may be precisely fixed (e.g., by active alignment) to form a predetermined optical link (e.g., in a receiver and/or transmitter of the transceiver). One end of the printed circuit board forms a signal input interface, and may include a gold/golden finger. A DFB (distributed feedback) laser is characterized by a built-in Bragg grating, and is in a class of semiconductor lasers that operate on or in a single longitudinal mode. DFB lasers mainly employ semiconductor materials as the light-generating medium. DFB lasers have excellent spectral characteristics and avoid dispersive effects in long-distance transmission, so DFB lasers are broadly employed in long-distance, high-speed applications.

FP (Fabry-Perot) lasers have an FP cavity and/or are a semiconductor-based light emitting device. An FP laser is configured to emit coherent light in multiple longitudinal modes, in which the FP cavity is a resonant cavity. Such devices are suited to long-distance communications and are characterized by high output optical power, small divergence angles, a narrow spectrum and a high modulation rate.

In one design, 4 laser chips emitting laser beams having the same wavelength (e.g., 1310 nm) and a divergence angle of 25-30° are provided and are precisely fixed to the printed circuit board.

Each of the GRIN lenses may comprise a cylindrical optical lens having a refractive index that varies along its radial axis. As a result, the GRIN lenses may smoothly focusing the light from laser devices to the multimode fiber array and/or from the multimode fiber array to the photodiode array. In the present invention, two GRIN lenses may flank (e.g., be positioned on opposite sides of) the filter and be fixed to the printed circuit board (e.g., after active alignment). The first GRIN lens may have dimensions of 6 mm×4 mm×4 mm, while the second GRIN lens may have dimensions of 3 mm×4 mm×4 mm. In other words, the first and second GRIN lenses may have the same area, but different thicknesses. The optical filter may comprise a wavelength-division filter and/or a band-pass filter that is transparent to laser beams from the transmitter but reflective (e.g., functioning as a band-elimination filter) to laser beams entering the transceiver from the multimode fiber array. That is, laser beams from the laser(s) that are focused by the first GRIN lens pass through the filter, while the laser beams received from the fiber array are focused by the second GRIN lens, reflected by the filter (or a surface thereof) towards the photodiode array, then the received laser beams are refocused by the second GRIN lens before being received before being received at the photodiode array.

The multimode fiber array may include one or more MTP/MPO standard connector interfaces, and have one or more dimensions and/or constructions defined by the MTP and/or MPO standard.

The PD chip array may comprise a linear array (e.g., a 1×4 array). PDs are generally easier to couple to other components in the optical transceiver than LDs.

FIG. 1 illustrates an exemplary parallel optical transceiver 10 in accordance with embodiments of the present invention. For example, a printed circuit board 15 configured to carry high frequency signals thereon may include a laser driving chip 20, a laser 30, a first GRIN lens 40, an optical and/or bandpass filter 50, a second GRIN lens 60, a fiber array 70, and a photoelectric detector 80 thereon. A transmitter in the optical transceiver 10 includes the laser driving chip 20, laser 30, first GRIN lens 40, optical and/or bandpass filter 50, second GRIN lens 60 and a fiber array 70, and a receiver in the optical transceiver 10 includes the fiber array 70, second GRIN lens 60, optical and/or bandpass filter 50, and photoelectric detector 80. The laser 30 may comprise one or more laser devices and/or chips (preferably N laser devices and/or chips, where N is an integer ≥2, ≥4, etc.), and the photoelectric detector 80 may comprise one or more photodiodes (preferably N photodiodes, where N is an integer ≥2, ≥4, etc.). Thus, the parallel optical transceiver 10 may be an N×N parallel optical transceiver.

The laser driving chip 20 sends electrical signals (e.g., representing data) to the laser 30, which generates one or more (e.g., N) optical signals that are focused by the first GRIN lens 40. The focused optical signal(s) pass through the filter 50, and are refocused by the second GRIN lens 60 on a location at or in the fiber array 70 (e.g., on a surface of the fibers). Light received by the optical transceiver 10 generally has a different wavelength than the light signals generated by the laser 30. Alternatively or additionally, the light received by the optical transceiver 10 may have a different polarization type (e.g., p-polarization or s-polarization) than the light signals generated by the laser 30. Incoming light from the fiber array 70 is focused by the second GRIN lens 60, reflected by the filter 50, refocused by the second GRIN lens 60 (not shown in FIG. 1), and absorbed or detected by the photoelectric detector 80. Details of the exemplary parallel optical transceiver 10 are discussed below with regard to further Figures.

A First Embodiment

Figure 2:
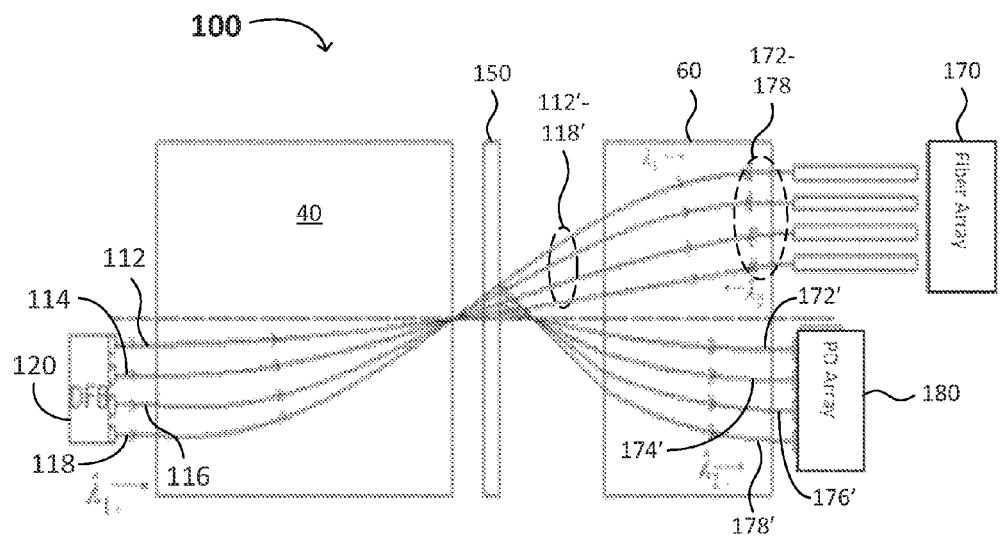
FIG. 2 is a diagram showing the optical link of an N×N parallel optical transceiver in accordance with embodiments of the present invention.

FIG. 2 illustrates an exemplary optical link 100 of the parallel optical transceiver (e.g., optical transceiver 10) in accordance with embodiments of the present invention. In the optical link at the transmitting end (e.g., the transmitter), laser beams 112-118 having the same wavelength $\lambda_1$ are emitted from a plurality of (e.g., 4) DFB laser chips 120 at the same time (e.g., simultaneously). The laser beams 112-118 are first focused by the first GRIN lens 40, then they pass through a wavelength-selective band-pass filter 150. The multiple (e.g., 4) focused laser beams 112'-118' are refocused by the second GRIN lens 60, then the refocused beams respectively enter the channels (e.g., 4 channels) in the fiber array 170.

In the optical link at the receiving end (e.g., the receiver), multiple (e.g., 4) laser beams 172-178 having the same wavelength $\lambda_2$ from the four channels in the fiber array 170 are focused by the second GRIN lens 60 and reflected by the surface of the wavelength-selective filter 150. The reflected laser beams 172'-178' are refocused by the second GRIN lens 60, then enter the PD chip array 180 (e.g., comprising 4 photodiodes or photodiode chips). The exemplary embodiment of FIG. 2 has the following attributes:

1. A single printed circuit board can be used as base and can support all components (e.g., 10-80 in FIG. 1) thereon. One end of the printed circuit board includes a signal input interface, which may be in the form of gold or golden finger.
2. Two GRIN lenses 40 and 60 are configured to flank the filter 150 and are fixed to the printed circuit board, for example after active alignment.
3. In the optical link at the transmitting end (e.g., transmitter), N (e.g., 4) DFB laser chips 120 are attached to the printed circuit board (e.g., by flip chip bonding after active alignment). The DFB laser devices may be spaced apart from each other by at least about 0.1 mm (e.g., by 0.1 mm), may have a numerical aperture of at least about 0.4 µm (e.g., by 0.4 µm), and may be spaced apart from the first GRIN lens 40 by a distance of at least about 0.5 mm (e.g., by 0.5 mm). Laser beams 112-118 having the same wavelength $\lambda_1$ emitted from the DFB laser chips 120 at the same time are first focused by the first GRIN lens 40 and then pass through the band-pass filter 150 having a transmissivity of at least 95% (e.g., higher than 95%) to the wavelength(s) of the beams 112'-118', then the laser beams 112'-118' are refocused by the second GRIN lens 60, and the refocused beams respectively enter the N (e.g., 4) channels in the fiber array 170.
4. In the optical link at the receiving end (e.g., receiver), N (e.g., 4) laser beams 172-178 having the same wavelength $\lambda_2$ from the N (e.g., 4) channels in the fiber array 170 are focused by the second GRIN lens 60 and reflected by the surface of the wavelength-selective and/or bandpass filter 150, and then the N reflected laser beams are refocused by the second GRIN lens 60 and enter the PD chip array 180. The PD chips may be spaced apart from each other by at least about 0.15 mm (e.g., 0.15 mm) in the PD array 180, and the center distance (e.g., the center-to-center distance) between the PD array 180 and the fiber array 170 may be at least about 0.7 mm (e.g., 0.7 mm).

A Second Embodiment

Figure 3:
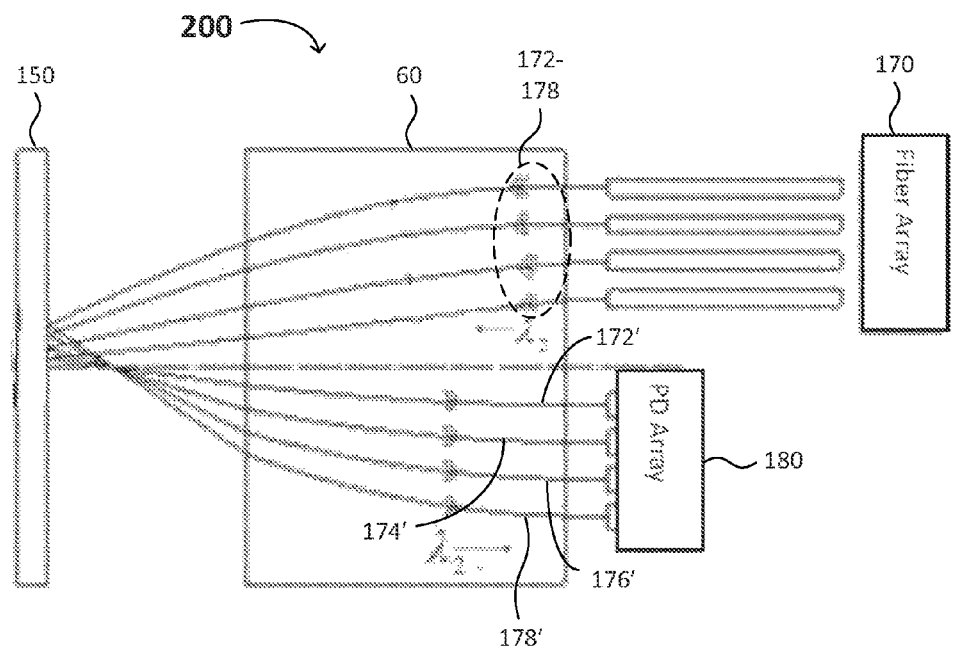
FIG. 3 is a diagram showing another optical link of an N×N parallel optical transceiver in accordance with embodiments of the present invention.

FIG. 3 illustrates an exemplary optical link of the parallel optical transceiver in accordance with embodiments of the present invention. In the parallel optical transceiver, or as shown in FIG. 3, a receiver 200, 4 laser beams 172-178 having the same wavelength $\lambda_2$ from the four channels in the fiber array 170 are focused by the second GRIN lens 60 and reflected by the surface of the wavelength-selective and/or bandpass filter 50, and then the 4 reflected laser beams 172'-178' are refocused by the second GRIN lens 60 and enter the PD chip array 180. As above, in embodiments of the present invention related to a FP laser, the only difference is that each DFB laser chip is replaced by a FP laser chip, so there is no more tautology.

A Third Embodiment

Figure 4:
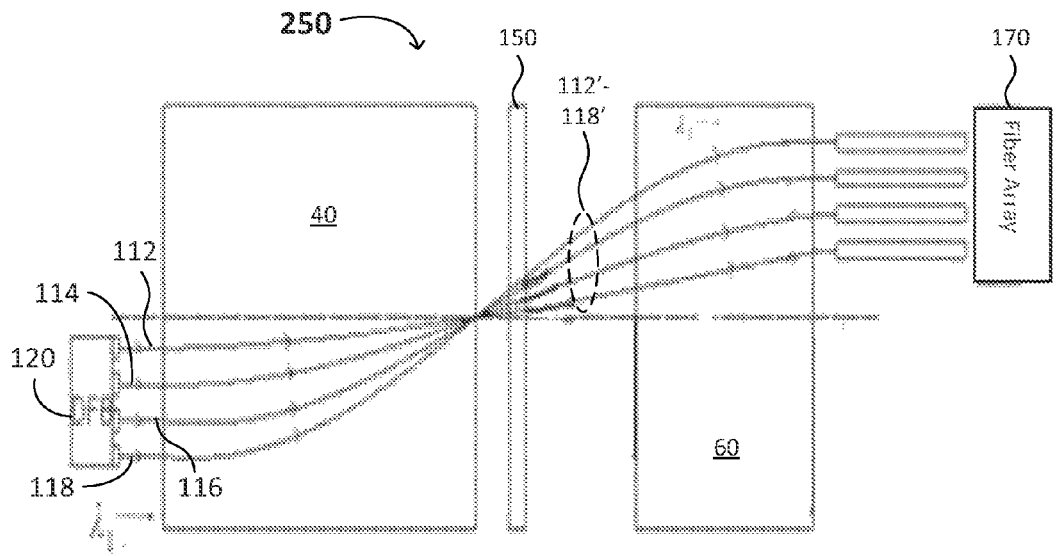
FIG. 4 is a diagram showing yet another optical link of an N×N parallel optical transceiver in accordance with embodiments of the present invention.

FIG. 4 illustrates an exemplary optical link of the parallel optical transceiver in with embodiments of the present invention. In the parallel optical transceiver, or as shown in FIG. 4, a transmitter 250, laser beams 112-118 having the same wavelength $\lambda_1$ emitted simultaneously from 4 DFB laser chips 110 are first focused by the first GRIN lens 40, then pass through the band pass filter 50, then the 4 laser beams are refocused by the second GRIN lens 60. After that, the beams respectively enter the 4 channels in the fiber array 170.

CONCLUSION/SUMMARY

The invention is intended to cover modifications and equivalents that may be included within the spirit and scope of the invention as defined by the present invention.

What is claimed is:
1. A parallel optical transceiver, comprising:
 a) a printed circuit board, wherein one end of the printed circuit board includes a signal input interface;
 b) a laser comprising a plurality of laser chips spaced apart by at least about 0.1 mm and that have a numerical aperture of 0.4 µm on the printed circuit board configured to simultaneously provide laser beams having a first common wavelength;
 c) a laser driving control chip configured to control the laser, and directly integrated onto or into the printed circuit board;
 d) a multimode fiber array having N channels, N being an integer of at least 2;

e) a band-pass filter configured to allow the laser beams to pass through to the multimode fiber array;

f) a first GRIN lens and a second GRIN lens that flank the band-pass filter and are fixed to the printed circuit board, wherein the first GRIN lens is configured to focus the laser beams, and the second GRIN lens is configured to refocus the laser beams on a location in or on the multimode fiber array after the laser beams pass through the band-pass filter; and g) a photodiode array.

2. The parallel optical transceiver of claim 1, wherein said laser comprises a DFB or FP laser chip, flip chip bonded to the printed circuit board.

3. The parallel optical transceiver of claim 1, wherein said plurality of laser chips are spaced apart from the first GRIN lens by a distance of at least about 0.5 mm.

4. The parallel optical transceiver of claim 1, wherein each of said first and second GRIN lenses comprise a cylindrical optical lens having a refractive index that varies along its radial axis.

5. The parallel optical transceiver of claim 1, wherein said multimode fiber array includes one or more MTP/MPO standard connector interfaces.

6. The parallel optical transceiver of claim 1, wherein said photodiode array comprises a linear array of N photodiodes.

7. The parallel optical transceiver of claim 6, wherein said N photodiodes are spaced apart from each other by at least about 0.15 mm, and the center distance between said photodiode array and said multimode fiber array is at least about 0.7 mm.

8. The parallel optical transceiver of claim 1, wherein said signal input interface comprises a gold or golden finger.

9. The parallel optical transceiver of claim 1, comprising a transmitting end having a first optical link, and a receiving end having a second optical link.

10. The parallel optical transceiver of claim 1, wherein said printed circuit board is configured to carry high frequency signals.

11. A parallel optical transceiver, comprising:

a) a printed circuit board, wherein one end of the printed circuit board includes a signal input interface;

b) a laser on the printed circuit board configured to simultaneously provide laser beams having a first common wavelength;

c) a laser driving control chip configured to control the laser, and directly integrated onto or into the printed circuit board;

d) a multimode fiber array having N channels, N being an integer of at least 2;

e) a band-pass filter configured to allow the laser beams to pass through to the multimode fiber array;

f) a first GRIN lens and a second GRIN lens that flank the band-pass filter and are fixed to the printed circuit board, wherein the first GRIN lens is configured to focus the laser beams, and the second GRIN lens is configured to refocus the laser beams on a location in or on the multimode fiber array after the laser beams pass through the band-pass filter; and g) a photodiode array comprising a linear array of N photodiodes, wherein said N photodiodes are spaced apart from each other by at least about 0.15 mm, and the center distance between said photodiode array and said multimode fiber array is at least about 0.7 mm.

12. The parallel optical transceiver of claim 11, wherein said laser comprises a plurality of laser chips spaced apart by at least about 0.1 mm and that have a numerical aperture of 0.4 pm.

13. The parallel optical transceiver of claim 11, wherein the first GRIN lens focuses N received laser beams from channels in the multimode fiber array, the N received laser beams have a same wavelength, a surface of the band-pass filter reflects the N focused received laser beams towards the photodiode array, and the second GRIN lens refocuses the N reflected laser beams.

14. A parallel optical transceiver, the optical transceiver comprising:

a) a printed circuit board forming a base, wherein one end of the printed circuit board includes a signal input interface;

b) a laser driving control chip;

c) a laser;

d) a multimode fiber array having N channels, N being an integer of at least 2;

e) a first GRIN lens fixed to the printed circuit board;

f) a linear array of N photodiodes, wherein said N photodiodes are spaced apart from each other by at least about 0.15 mm, and the center distance between said photodiode array and said multimode fiber array is at least about 0.7 mm;

g) an optical filter fixed to the printed circuit board, configured to reflect N laser beams having a common wavelength from the N channels in the multimode fiber array towards the linear array of N photodiodes; and h) a second GRIN lens configured to focus the N received laser beams from channels in the multimode fiber array.

15. The parallel optical transceiver of claim 14, wherein said laser simultaneously provides N laser beams having a different common wavelength, and said first GRIN lens focuses the N laser beams having the different common wavelength, the band-pass filter allows the N laser beams having the different common wavelength to pass through to the second GRIN lens, then the second GRIN lens refocuses the N laser beams having the different common wavelength on a location on or in the multimode fiber array.

16. The parallel optical transceiver of claim 14, wherein said signal input interface comprises a gold or golden finger.

17. The parallel optical transceiver of claim 14, wherein said printed circuit board is configured to carry high frequency signals.

18. An N×N parallel optical transceiver, the optical transceiver comprising:

a) a printed circuit board having one end that includes a signal input interface;

b) a laser driving control chip, c) a plurality of laser chips spaced apart by at least about 0.1 mm and that have a numerical aperture of 0.4 μm, attached to the printed circuit board and configured to simultaneously provide N laser beams having a first common wavelength, N being an integer of at least 2;

d) a first GRIN lens configured to focus the N laser beams;

e) an optical band-pass filter fixed to the printed circuit board and transparent to light having the first common wavelength;

f) a multimode fiber array having N channels therein; and g) a second GRIN lens, configured to refocus the N laser beams on locations on or in the N channels of the multimode fiber array, wherein one of the first and second GRIN lenses is fixed to the printed circuit board.

19. The N×N optical transceiver of claim 18, further comprising an array of N photodiodes, wherein the second GRIN lens focuses N received laser beams from channels in the multimode fiber array, the N received laser beams have a second common wavelength, the optical band-pass filter reflects the N focused received laser beams towards the photodiode array, and the second GRIN lens refocuses the N reflected laser beams.

20. The parallel optical transceiver of claim 18, wherein said signal input interface comprises a gold or golden finger.

21. The parallel optical transceiver of claim 18, wherein said printed circuit board is configured to carry high frequency signals.

* * * * *